United States Patent [19]

Chambost et al.

[11] Patent Number: 5,047,655
[45] Date of Patent: Sep. 10, 1991

[54] PROGRAMMABLE ANALOG NEURAL NETWORK

[75] Inventors: Emmanuel Chambost, Limours; Francois Vallet, Montigny Le Bretonneux, both of France

[73] Assignee: Thomson - CSF, Puteaux, France

[21] Appl. No.: 486,965

[22] Filed: Mar. 1, 1990

[51] Int. Cl.$^5$ .............................................. G06F 7/00
[52] U.S. Cl. ................................. 307/201; 307/296.1; 364/807
[58] Field of Search ................... 307/201, 296.1, 296.6; 364/513, 807

[56] References Cited

U.S. PATENT DOCUMENTS

| | | |
|---|---|---|
| 3,516,005 | 6/1970 | Brown. |
| 4,737,929 | 4/1988 | Deuker ................................. 364/807 |
| 4,782,460 | 11/1988 | Spencer ................................ 364/807 |
| 4,873,455 | 10/1989 | Chambost et al. .................... 307/201 |
| 4,873,661 | 10/1989 | Tsividis .................................. 364/807 |
| 4,903,226 | 2/1990 | Tsividis .................................. 364/807 |
| 4,947,482 | 8/1990 | Brown .............................. 307/201 X |
| 4,956,564 | 9/1990 | Holler et al. ......................... 307/201 |
| 4,961,002 | 10/1990 | Tam et al. ............................ 307/201 |

OTHER PUBLICATIONS

Mackie et al., "Implementations of Neural Networks Models in Silicon", NATO Advanced Research Workshop paper; Neuss, F.R.G., 9/28–10/2/87.
Computer, vol. 21; No. 3, Mar. 1988; "Neural Nets For ..." B. Widrow.
Proceedings of IEEE Int'l Conference, Jul. 1988, "Stochastic Neural Networks ..." Foo et al.
Proceedings of First Int'l Conference, May 1987; "A VLSI concept ..." Rueckert et al.
Proceedings of the Neural Networks, Jun. 1988; "VLSI Neural Network"—GRAF et al.

Primary Examiner—David Hudspeth
Attorney, Agent, or Firm—Roland Plottel

[57] ABSTRACT

The neural network of the invention, of the type with a Cartesian matrix, has a first column of addition of the input signals, and at each intersection of the M lines and N columns it comprises a synapse constituted of a simple logic gate.

5 Claims, 4 Drawing Sheets

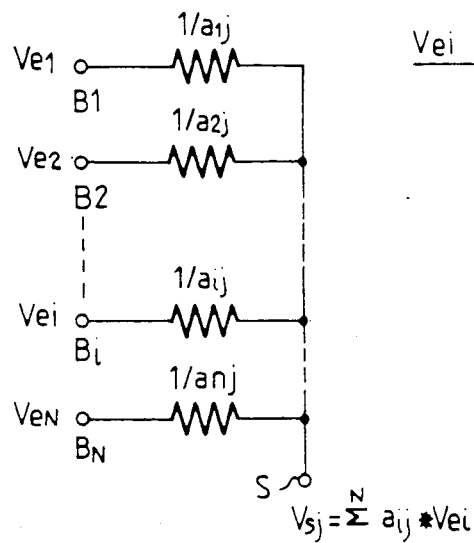
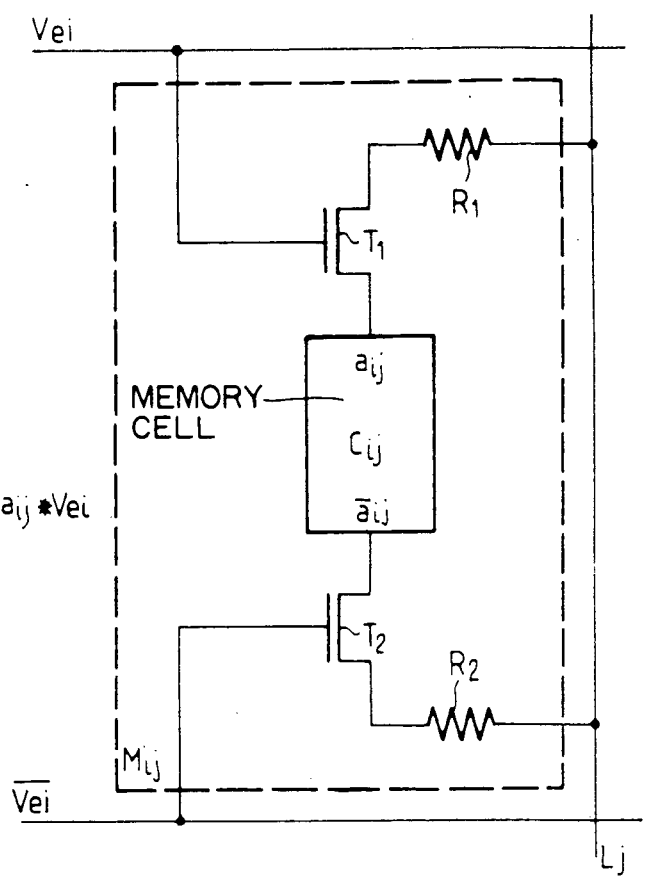
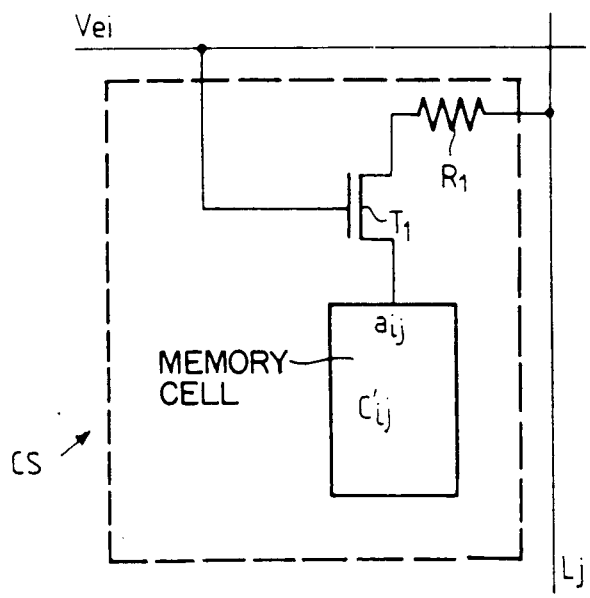
FIG_4

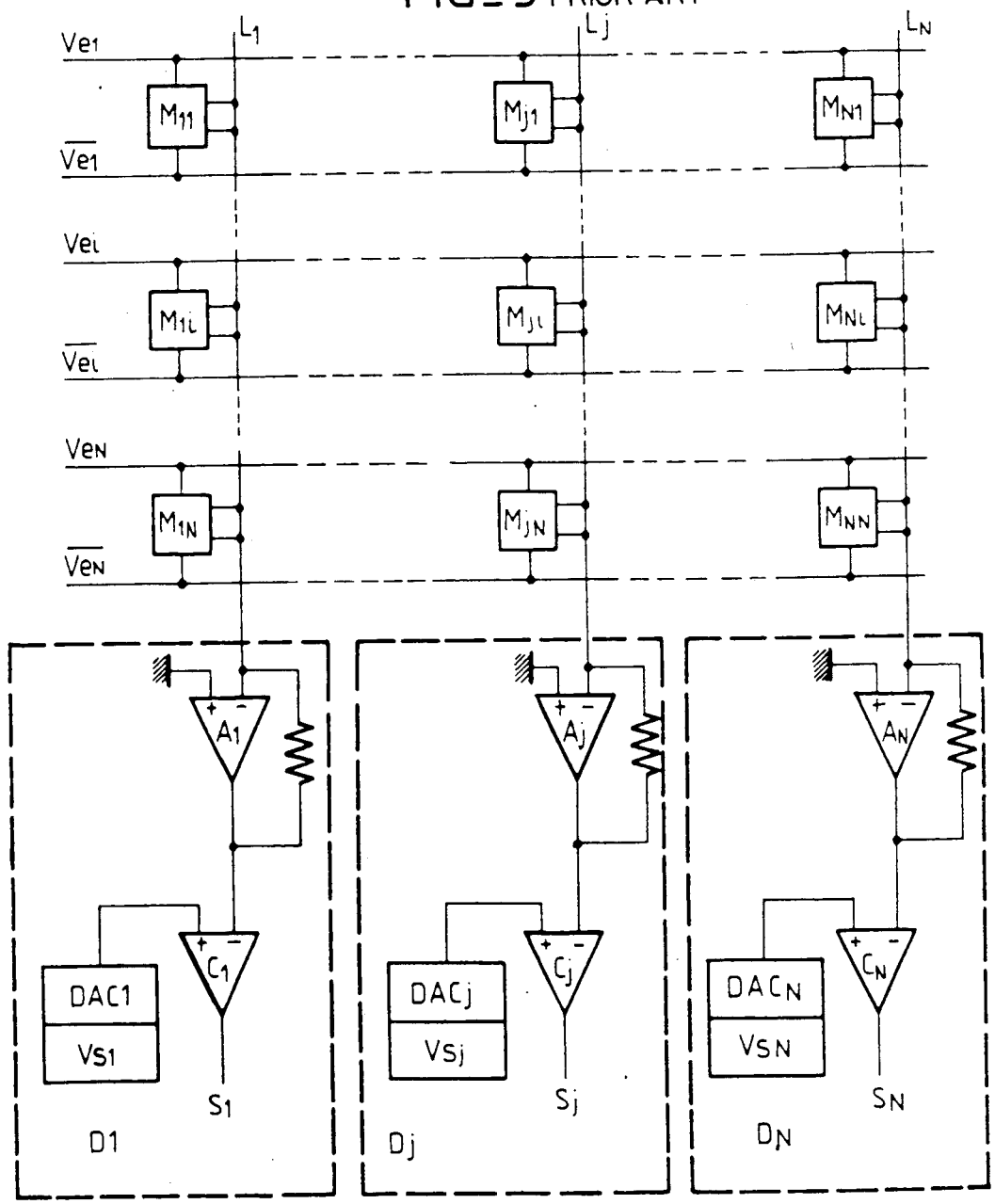
FIG_3 PRIOR ART

FIG_5a
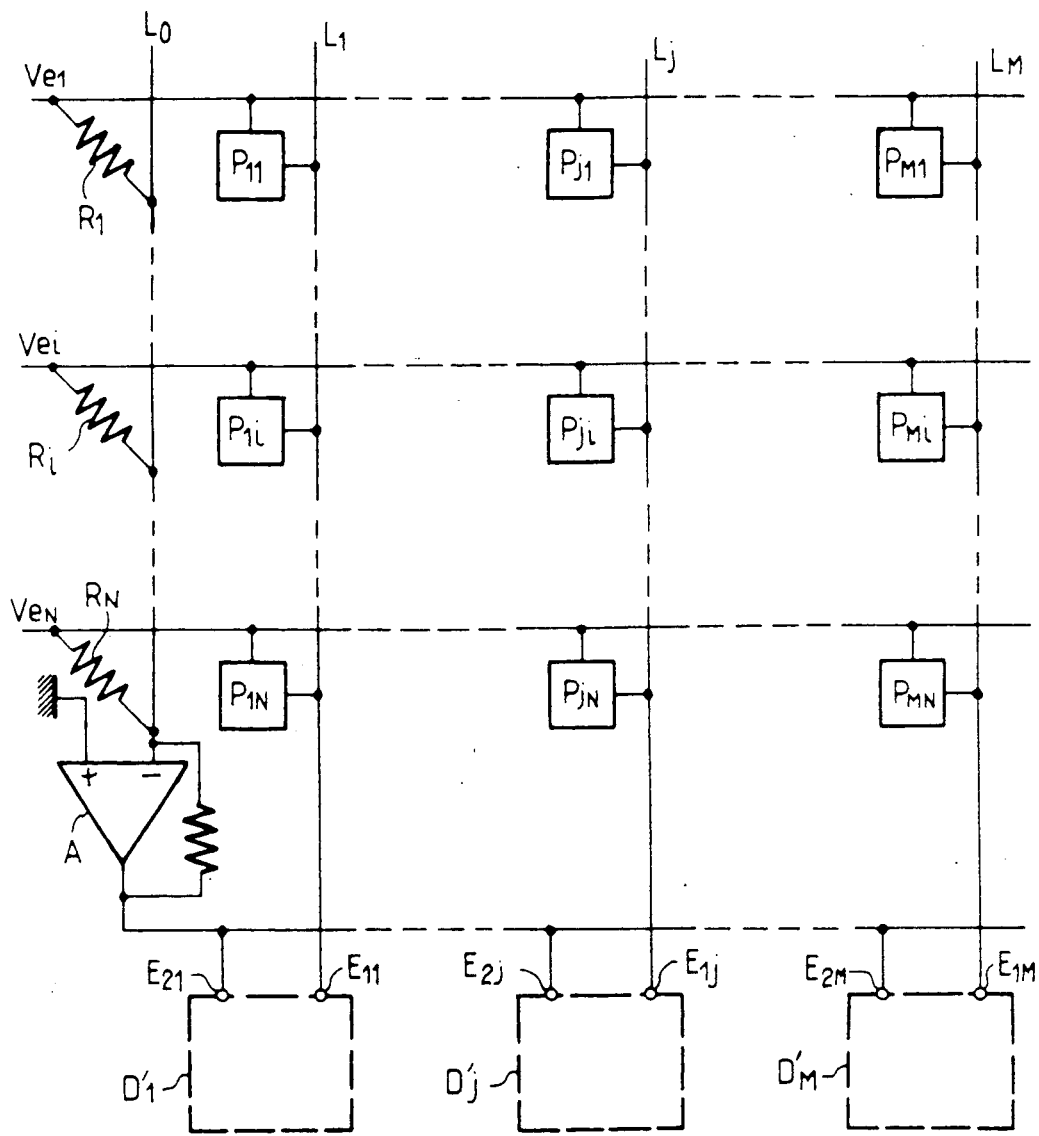
FIG_5b
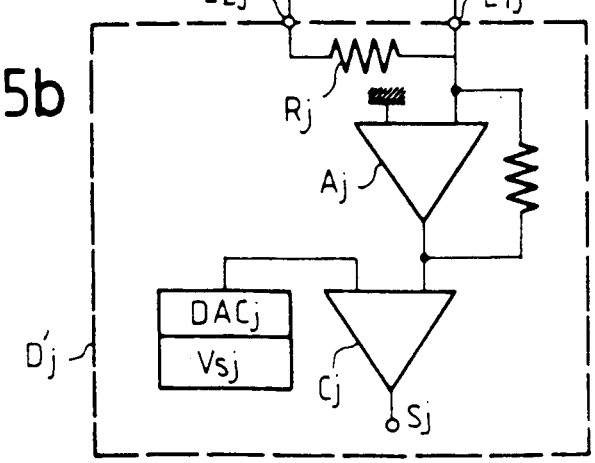

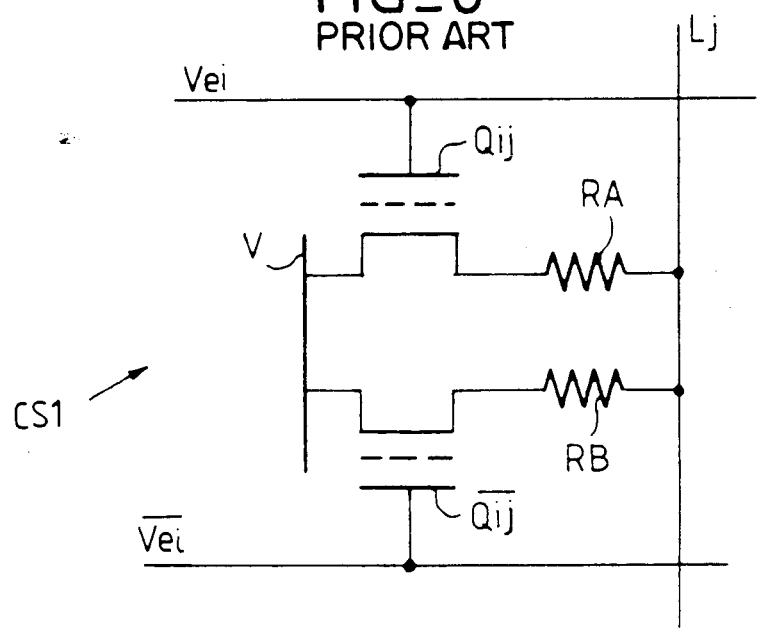
FIG_6 PRIOR ART
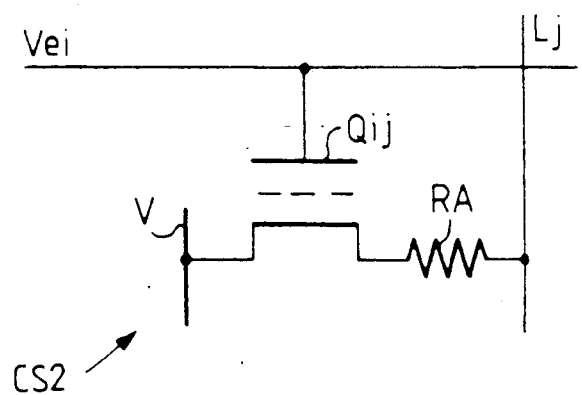
FIG_7

PROGRAMMABLE ANALOG NEURAL NETWORK

FIELD OF THE INVENTION

The present invention concerns a programmable analogue neural network.

DESCRIPTION OF THE PRIOR ART

Neural networks, in the techniques developed in the field of artificial intelligence, designate electric circuits capable of performing transformations on vectors having a large number of components. Numerous examples of realisation of these circuits are known, for example, the description of the principle in the article by J. J. Hopfield and D. W. Tank entitled "Neural computation of decision in optimization problems", published in the journal Biological Cybernetics 52, pp 141 to 152 (1985), or the article by H. Graf and P. de Vegvar "a CMOS Associative memory chip based on Neural Networks" published in the proceeding of the ISCC 1987.

The object of these networks is to perform operations of the form:

$$[V_s] = 1 \cdot [A_{ij}][V_e]$$

where $[V_e]$ is an input vector with N components $V_{ei}$ such that $V_{ei} \epsilon \{-1, +1\}$, $[V_s]$ is an output vector with M components $V_{sj}$ such that $V_{sj} \epsilon \{-1, +1\}$ and where $[A_{ij}]$ is a matrix of N×M positive or negative coefficients $a_{ij}$.

1. $[A_{ij}]$ designates the operation which for an input vector $[V_e]$ provides a corresponding output vector $[V_s]$ such that:

$$V_{sj} = \text{sign}\left(\sum_{i=1}^{N} a_{ij} * V_{ei}\right),$$

i.e. a scalar product of two vectors, with the convention that sign (x) = 1 if x > 0 sign (x) = −1 if x < 0

The coefficients $a_{ij}$ are called "synaptic coefficients" or "synaptic weights".

The advantage of performing the operation $a_{ij} * V_{ei}$ analogically in accordance with the circuit diagram in FIG. 1 has long been known. In the circuit in FIG. 1, n input terminals B1 to Bn are connected to a common output $S_j$ each via a resistor of value 1/apj with p having the value of 1 to n respectively. The input signals on terminals B1 to Bn are respectively $V_{e1}$ to $V_{en}$. At the output S we get $$V_{sj} = \sum_{i=1}^{N} A_{ij} * V_{ei}.$$

The resistors shown in this figure and in the following figures do not necessarily represent a linear resistance but all sorts of loads used in microelectronics, notably in CMOS techniques, for transistors whose grid is connected to the source or to the drain. It should be noted that if the common point is loaded at infinite impedance, the addition is performed in voltage, whereas if the common point is loaded at zero impedance, the addition is performed in current.

As only a rough part of the information will be retained, −1 or +1, very great precision is not necessary, on the other hand, the advantage of rapidity arising from the structure shown in FIG. 1 is interesting: the characteristic of analogue addition is that it enables all the terms of the sum to be added in parallel and not sequentially as in digital devices.

In addition, it has been shown by E. de Chambost, in a communication at n'EURO'88, "Linear classification with binary connection networks", in Paris in June 1988, that neural networks retained most of their properties if the resolution of each synaptic coefficient was reduced to a single bit of information, i.e. if two single values of $a_{ij}$ were permitted: −1 or +1.

FIGS. 2, 3, 4, 5 and 6, described below, concern this particular case which is particularly interesting for the construction of programmable analogue neural networks: a single binary cell is assigned to a coefficient $a_{ij}$.

In the following part of the description, we work on the assumption that the operations of writing new tables of coefficients $a_{ij}$ are much less frequent than the operations of loading a new input vector $[V_e]$.

The solution consisting in physically constructing the resistors in FIG. 1 on a microelectronic circuit is not advantageous, as it would require the masks used in the technological process to be modified each time the value of the synaptic coefficients needs to be modified, which would be too expensive.

Programmable Analogue Neural Networks are analogue neural networks whose synaptic coefficients can be modified electrically, in the same way as a binary word can be written in an electronic memory.

The conventional solution for the construction of programmable analogue neural networks is that represented schematically in FIGS. 2 and 3.

In FIG. 2, the rectangle of broken lines, referenced $M_{ij}$, delimits a synaptic connection according to the state of the art. $C_{ij}$ is a memory cell constructed in accordance with known techniques. The cell $C_{ij}$ delivers a logical state $a_{ij}$ at a first output, and at a second output its complement $\overline{a_{ij}}$. These outputs are each connected to a column conductor Lj via an FET transistor (T1, T2 respectively) in series with a resistor (R1, R2 respectively). The grid of T1, T2 is respectively connected to a line $V_{ei}$ and a line $\overline{V_{ei}}$ with a logical state complementary to that of $V_{ei}$.

In FIG. 3 is shown a part of a matrix of synaptic connections such as those in FIG. 2. This matrix comprises lines $\overline{V_{ei}}$ to $\overline{V_{en}}$ and lines $V_{ei}$ to $V_{en}$ with respectively complementary logical states, and columns L1 to Ln. At each synapse (intersection of a column with two complementary lines such as $V_{ek}$ and $\overline{V_{ek}}$) is placed a synaptic connection such as that in FIG. 2. Each column L1 to Ln is connected by an operational amplifier A1 to A$_N$ to the input of a comparator C1 to C$_N$ whose other input receives an digital offset voltage $V_{s1}$ to $V_{sn}$, memorised in the form of a binary word, via a digital-to-analogue converter DAC1 to DAC$_n$. The group D1 to D$_n$ of these elements connected to each column constitutes a detection device, performing signal current addition of the N input signals of the corresponding column.

"0" and "1" designate the two states found on electric circuits in binary logic, $I_{ij}$ being the current resulting from the elementary connection in FIG. 2, proportional to $a_{ij} * V_{ei}$, the truth table of the current $I_{ij}$ is as follows:

|   | 0 | 1 | $V_{ei}$ |
|---|---|---|---|
| 0 | 1 | 0 | |
| 1 | 0 | 1 | |
| $a_{ij}$ | | | |

This truth table is isomorphic with that of multiplication in $\{-1, +1\}$

|    | -1 | 1  |
|----|----|----|
| -1 | 1  | -1 |
| 1  | -1 | 1  |

As it is often necessary for a neural network to offset the sum $\Sigma a_{ij} * V_{ei}$ by a threshold VS associated with a set of coefficients $(a_{1j}, \ldots a_{ij}, \ldots a_{nj})$, the complete structure of a programmable analogue network is that represented in FIG. 3. This displacement is performed in the comparators $C_1$ to $C_N$ using the voltages $V_{s1}$ to $V_{sn}$.

The need to divide the lines $V_{ei}$ into two parts, as shown in FIG. 3, arises from the fact that a single line would enable an operation isomorphic with multiplication to be performed in the space $\{0, 1\}$ and not in the space $\{-1, 1\}$.

SUMMARY OF THE INVENTION

The object of the present invention is a programmable analogue neural network enabling a multiplication truth table to be implemented in the space $\{-1, 1\}$ using fewer components than in the known circuits cited above.

The programmable analogue neural network according to the invention, of the type with a Cartesian matrix with N inputs and M outputs, includes a first addition circuit connected to the N inputs, N lines and M columns, the N×M synapses being each constituted by a logic gate, the M columns each being connected to a column addition circuit, another input of each of these column addition circuits being connected to the output of said first addition circuit, and still another input of each of these column addition circuits being connected to a circuit producing adjustable voltage.

BRIEF DESCRIPTION OF THE DRAWINGS

The present invention will be better understood on reading the detailed description of an embodiment, illustrated by the appended drawing, in which:

FIG. 1 is a diagram of a known circuit performing an analogue addition,

FIG. 2 is a general diagram of a synaptic connection according to the state of the art, FIG. 3 is a simplified diagram of a synaptic connection matrix, according to the state of the art, FIG. 4 is a diagram of a synaptic connection according to the present invention, FIGS. 5a and 5b are a simplified diagram of a programmable analogue neural network according to the invention, FIG. 6 is a diagram of a synaptic connection in EEPROM technology according to the state of the art, and FIG. 7 is a diagram of a synaptic connection in EEPROM technology according to the invention.

FIGS. 1 to 3 have already been described above.

DESCRIPTION OF THE PREFERRED EMBODIMENTS

Throughout the present description the matrices are described as having input lines and output columns, but the roles of the lines and the columns are of course interchangeable, these designations being used only to facilitate the explanations.

On the diagram in FIG. 4 a single synaptic connection CS is shown forming part of a matrix of which only part of an input line conductor $V_{ei}$ and part of a column conductor $L_j$ have been shown.

The connection CS includes a memory cell $C'_{ij}$ constituted for example of a logic gate of type "OR" or "AND" whose terminal $a_{ij}$ is connected by the source-drain path of an FET transistor T1 in series with a resistor R1 to the conductor $L_j$, the grid of T1 being connected to the conductor $V_{ei}$. Thus we have saved a transistor with its drain resistance and a line conductor ($\overline{V_{ei}}$).

The connection CS enables the truth table of a multiplication to be implemented for the following reasons:

A synaptic connection physically performs the function:

$$\text{sign}\left(\sum_{i=1}^{N} a_{ij} * V_{ei}\right)$$

where
$a_{ij} \in \{-1, +1\}$
and $V_{ei} \in \{-1, +1\}$
If we put:
$a_{ij} = 2 * a'_{ij} - 1$
and $V_{ei} = 2 * V'_{ei} - 1$
we obtain:

$$\sum_{i=1}^{N} a_{ij} * V_{ei} = \sum_{i=1}^{N} (2 * a'_{ij} - 1) * (2 * V'_{ei} - 1) = \quad (2)$$

$$4 \underbrace{\sum_{i=1}^{N} a'_{ij} * V'_{ei}}_{A} - 2 \underbrace{\sum_{i=1}^{N} V'_{ei}}_{B} - 2 \underbrace{\sum_{i=1}^{N} a'_{ij} - 1}_{C}$$

The 3 terms A, B, C can be implemented using logic gates simply due to the fact that:

$a_{ij} \in \{0,1\}$ and that $V'_{ei} \in \{0,1\}$

In relation (2), the term A is a scalar product which can be implemented using a series of simple logic gates such as that shown in FIG. 4. The term B depends on the input vector but is identical for all the columns. It must be calculated for each input vector. The term C does not depend on the input vector, but only on the value of the coefficients of the corresponding column.

The matrix, shown in simplified form in FIG. 5, enables the various operations of the above-mentioned relation (2) to be performed. This matrix has N line conductors $V_{e1}$ to $V_{en}$ and M column conductors $L_1$ to $L_M$. In practice, in the majority of cases M=N. At each intersection (or synapse) of the matrix, a logic gate, $P_{11}$ to $P_{MN}$, such as the gate in FIG. 4 is connected, which performs an operation isomorphic to a scalar product as soon as $a'_{ij} \in \{0,1\}$ and $V'_{ei} \in \{0,1\}$. A column conductor $L_o$ is connected to each line by a resistor, $R_1$ to $R_N$. This column $L_o$ is connected to the inverting input of an operational amplifier A.

Each of the other columns $L_1$ to $L_M$ is connected to a first input, $E_{11}$ to $E_{1M}$, of an addition device, $D'_1$ to $D'_M$. The output from the amplifier A is at the same time connected to a second input, $E_{21}$ to $E_{2M}$, of all the devices $D'_1$ to $D'_M$.

All the devices $D'_1$ to $D'_M$ are identical. In FIGS. 5a and 5b we have shown in detail only the device $D'_j$. In this device $D'_j$ the input terminal $E_{1j}$ is directly connected to the input of an operational amplifier $A_j$, and the terminal $E_{2j}$ is connected to the same input of the amplifier via a resistor $R_j$. The output from the amplifier $A_j$ is connected to a first input of a comparator $C_j$, a second input of which is connected to the output of a digital-analogue converter $DAC_j$ receiving a binary word $V_{sj}$.

In the matrix in FIG. 5a, the amplifier A with the column $L_o$ and the resistors $R_1$ to $R_N$ constitute a circuit implementing the term B of the equation (2) above, i.e. performing the addition of the N input signals. The output signal from this circuit is sent in offset to each circuit $D'_1$ to $D'_N$ (via the terminal $E_{21}$ to $E_{2N}$ respectively).

As specified above, the different gates $P_{11}$ to $P_{MN}$ perform the operations isomorphic to scalar products (term A of the relation (2)).

Term C of the relation (2), which depends only on the value of the coefficients affecting the input vectors, is determined for each column in the circuits $D'_1$ to $D'_M$, by the value $V_{S1}$ to $V_{SM}$ (in the form of a binary word, therefore easy to modify by program, converted into an analogue value by the converters $DAC_1$ to $DAC_M$). This digital value converted into an analogue value constitutes an offset of the signal of each column in the comparators $C_1$ to $C_M$.

Of course, the coefficients 2 and 4 of the terms A, B and C are easily obtained in the circuits $D'_1$ to $D'_M$ by corresponding adjustment of the resistors of the operational amplifiers $A_1$ to $A_M$.

In FIG. 6 is shown the diagram of a synaptic connection CS1 in EEPROM technology with a floating grid, according to the state of the art. The connection CS1 includes two transistors $\overline{Q_{ij}}$ and $Q_{ij}$ whose control grids are connected respectively to lines $V_{ei}$ and $\overline{V_{ei}}$, whose drains are connected via a resistor, RA, RB respectively to a column $L_j$ and whose sources are connected to a reference potential V.

On the other hand, the synaptic connection CS2 in FIG. 7, according to the invention, still using EEPROM technology, needs only one line $V_{ei}$ and one transistor $Q_{ij}$ whose drain is connected via the resistor RA to the column $L_j$ and whose source is connected to the reference potential V.

Although the device of the invention can be constructed using various techniques such as SRAM-CMOS, it is more profitable to make it using EEPROM technology with a floating grid, since in this case each memory cell normally has no transistor storing the state complementary to that stored in the form of loads in the grid of the single transistor (i.e. no state $\overline{a_{ij}}$, see FIG. 2). The space occupied by a matrix is thus reduced by half, compared with CMOS technology.

Of course dynamic memories cannot be used to construct the matrices of the invention, since their refresh principle makes impossible any collective reading, which is necessary in neural networks.

What is claimed is:

1. Programmable analogue neural network, of the type with a Cartesian matrix with N inputs and M outputs, comprising: a first addition circuit connected to the N inputs, said matrix further comprising N lines and M columns, the N.M synapses each being constituted by a logic gate, the M columns each being connected to a column addition circuit, another input of each of these column addition circuits being connected to the output of said first addition circuit and still another input of each of these column addition circuits being connected to a circuit producing an adjustable voltage.

2. Neural network according to claim 1, wherein the circuit producing adjustable voltage includes a digital-to-analogue converter receiving a binary word.

3. Neural network according to claim 2, wherein the binary word can be modified by programming.

4. Neural network according to claim 1, wherein the synapses are manufactured using EEPROM technology with a floating gate transistor.

5. Neural network according to claim 1, wherein the synapses are manufactured using SRAM-CMOS technology.

* * * * *